United States Patent Office
3,651,126
Patented Mar. 21, 1972

3,651,126
PREPARATION OF o-METHYLBENZOIC ACID
AND DERIVATIVES THEREOF
Anthony T. Jurewicz, Edison, and Le Roy S. Forney, Metuchen, N.J., assignors to Mobil Oil Corporation
No Drawing. Filed Jan. 16, 1969, Ser. No. 791,796
Int. Cl. C07c 69/78, 69/80
U.S. Cl. 260—475 R
5 Claims

ABSTRACT OF THE DISCLOSURE

Phthalide and substituted (4, 5, 6, 7 positions) derivatives are converted to o-methylbenzoic acids by hydrogenolysis in alcohol, using a protic acid catalyst, over palladium metal catalyst. o-Methylterephthalic acid is prepared in this way from 5-carboxyphthalide, and is useful for making non-crystalline polyesters. o-Methylbenzoic acids have a variety of uses, such as the preparation of alkyl and polyester resins and in organic synthesis.

BACKGROUND OF THE INVENTION

Field of the invention

This invention is concerned with the preparation of o-methylbenzoic acid and derivatives by hydrogenolysis of the corresponding phthalides.

DESCRIPTION OF THE PRIOR ART o-Methylbenzoic acids have been prepared by hydrolysis of the corresponding nitriles and by partial oxidation of polymethylbenzenes. The former method requires preparation of the nitriles, usually from the corresponding halide. The latter method is non-specific and has poor selectivity for the desired product.

SUMMARY OF THE INVENTION

This invention provides a process for producing o-methylbenzoic acid and derivatives thereof that comprises subjecting to hydrogenolysis a phthalide compound reactant having the formula:

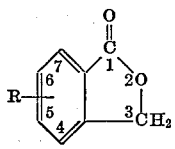

wherein R is hydrogen, alkyl ($C_1$–$C_3$), carboxy, nitro, halogen, or alkoxycarbonyl ($C_1$–$C_3$), and can occupy any 4, 5, 6, 7 position, in an alcohol ($C_1$–$C_4$) solution, using a protic acid catalyst and a palladium metal catalyst.

DESCRIPTION OF SPECIFIC EMBODIMENTS

The phthalide compound reacants utilizable in the process of this invention are readily obtained by methods well known in the art. Typical phthalides are phthalide, 5-carboxyphthalide, 5-methoxycarbonylphthalide, 6-ethylphthalide, 4-chlorophthalide, 5-bromophthalide, 7-iodophthalide, 6-nitrophthalide, 7-propylphthalide, and 4-propoxycarbonylphthalide.

The alcohol medium in which the hydrogenolysis reaction is carried out is an alkanol having between 1 and 4 carbon atoms. Typical are methanol, ethanol, propanol, isopropanol, and isobutanol. Because the reaction is carried out in an alcohol medium the immediate product is an ester. The free carboxylic acid can be obtained by known means, such as hydrolysis or saponification and acidification.

The protic acid can be inorganic, such as sulfuric acid and hydrochloric acid. It can, alternatively, be an organic acid, such as p-toluenesulfonic acid and sulfonated polystyrene resins.

The catalyst used is metallic palladium, usually on an inert support, such as charcoal, pumice, asbestos, and alumina. The amount of palladium on the support can vary between about one percent and about 10 percent, by weight of the catalyst. Other hydrogenation-dehydrogenation catalysts did not appear to be utilizable. Nickel on kieselguhr was ineffective. Rhodium on charcoal induced hydrogenation of the benzene ring.

Temperature does not appear to be a critical factor. Successful runs have been carried out at temperatures as low as 50° C. and as high as 170° C. Reaction rate, however, will be temperature dependent.

Although atmospheric pressure may be used for the reaction, higher hydrogen pressures increase the reaction rate, and hence the use of autoclaves is indicated. The hydrogen can be charged at pressures varying between about 50 p.s.i.g. and about 1800 p.s.i.g. In most cases, the theoretical pressure was small and hence essentially unobservable. However, in several larger runs, pressure drops were observed. Thus, this would be a good way to follow the reaction on a commercial scale.

EXAMPLE 1

5-methoxycarbonylphthalide (9.6 g., 0.05 mole), 98% $H_2SO_4$ (1 ml.) and 5% palladium on charcoal in methanol (75 ml.) were charged to a 300 cc. stainless steel autoclave. The autoclave was pressurized with hydrogen to 100 p.s.i.g. and heated at 50° C. for 1 hour. After removing the mixture, the catalyst was filtered off, the solution was poured into water and extracted with dichloromethane. The dichloromethane was evaporated giving 8.5 g. (85% recovery) of solid. Analysis by gas chromatography showed a 100% conversion with a 97.5% selectivity to dimethyl ester of 2-methylterephthalic acid. This product was confirmed by its infrared, NMR and melting point (70–71°).

EXAMPLE 2

Phthalide (6.7 g., 0.05 mole), 98% $H_2SO_4$ (1 ml.) and 5% palladium on charcoal in methanol (75 ml.) were charged to a 300 cc. stainless steel autoclave. The autoclave was pressurized to 500 p.s.i.g. with hydrogen and heated at 100° C. for 1 hour. After removing the mixture, the catalyst was filtered, and the filtrate poured into water and extracted with dichloromethane. Evaporation the dichloromethane yielded a liquid (6.6 g., 88% recovery). Analysis by gas chromatography showed 100% conversion and selectivity. The product was confirmed by infrared to be 2-methylbenzoic acid, methyl ester.

Although the present invention has been described with preferred embodiments, it is to be understood that modifications and variations may be resorted to, without departing from the spirit and scope of this invention, as those skilled in the art will readily understand. Such varations and modifications are considered to be within the purview and scope of the appended claims.

What is claimed is:

1. A process for producing o-methylbenzoic acid esters and derivatives thereof that comprises subjecting to hydrogenolysis a phthalide compound reactant having the formula:

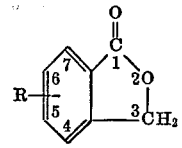

wherein R is hydrogen, alkyl, ($C_1$–$C_3$), nitro, halogen, carboxy, or alkoxycarbonyl ($C_1$–$C_3$) and can occupy any 4, 5, 6, or 7 position, in an alcohol ($C_1$–$C_4$) solution, using a protic acid catalyst and a palladium metal catalyst, at a temperature between about 50° C. and about 170° C. and at a pressure of 50–1800 p.s.i.g.

2. The process of claim 1, wherein said phthalide compound reactant is 5-methoxycarbonylphthalide.

3. The process of claim 1, wherein said phthalide compound reactant is phthalide.

4. The process of claim 2, wherein said alcohol is methanol and said protic acid is sulphuric acid.

5. The process of claim 3, wherein said alcohol is methanol and said protic acid is sulphuric acid.

References Cited

Mitsui et al., as cited in Chem. Asbtracts, 57, p. 16453 (1962).

Groggins, Unit Processes in Organic Chemistry, pp. 607–609 (1952).

LORRAINE A. WEINBERGER, Primary Examiner

E. J. SKELLY, Assistant Examiner

U.S. Cl. X.R.

260—471 R, 476 R